March 12, 1940.  H. S. NEWCOMER  2,193,465

PROJECTION OPTICAL SYSTEM

Filed June 22, 1936  4 Sheets-Sheet 1

FIG. 1

(PRIOR ART)

(PRIOR ART)

INVENTOR
HARRY SIDNEY NEWCOMER
BY Maurice B Landis
ATTORNEY

INVENTOR
HARRY SIDNEY NEWCOMER
ATTORNEY

March 12, 1940.    H. S. NEWCOMER    2,193,465
PROJECTION OPTICAL SYSTEM
Filed June 22, 1936     4 Sheets-Sheet 3

INVENTOR
HARRY SIDNEY NEWCOMER
BY
ATTORNEY

Patented Mar. 12, 1940

2,193,465

UNITED STATES PATENT OFFICE 2,193,465

PROJECTION OPTICAL SYSTEM

Harry Sidney Newcomer, New York, N. Y.

Application June 22, 1936, Serial No. 86,647

16 Claims. (Cl. 88—24)

This invention relates to projection optical systems and has for an object to provide an improved optical system of the type in which the object is anamorphosed so as to be imaged with two different magnifications in two different meridians. In one embodiment of the invention an additional feature is provided whereby the projection system is off center from the axial point of the object, that is it is placed on an axis which is displaced to one side of and parallel to the axis of the object to be imaged, which object axis itself is decidedly off center from a condenser system which includes a light source and a condenser used alternatively for either a central axial projection system or the displaced one.

This invention finds particular application in the reduction printing of sound track, as from 35 mm. to 16 mm. film, permitting the obtention of a magnification in a meridian in the axis of the films, i. e. along the lengths of the film equal to their ratio of rates of travel, which rates of travel are or may be proportionate to the respective number of frames per foot in each film, and permitting the obtention in the other meridian at right angles to the axes of the films of any suitable magnification or width of the imaged sound track. In the preferred example herein described the sound track is magnified in width 1.94 times what it would have been if straight reduction printing from 35 mm. to 16 mm. film had been accomplished.

It is not to be understood that the invention is limited to the particular embodiments herein set forth nor to any particular ratio of magnification in two meridians. It might be used, for instance, for printing a track of non standard width on standard film from standard track. Nor is the invention limited to off center imagery. In the reduction printing of sound track, for instance, the illuminating system might be centered on the sound track gate, and/or the two sound tracks or object and image areas might be substantially in one mechanical axis.

Projection anamorphosis of motion picture images is old in the art. Zollinger in U. S. Patent 1,032,172 issued July 9, 1912, describes unidimensional compression of discrete pictures to save space on film, and then anamorphosis on projection so as to restore the picture to normal proportions. Parker, in U. S. Patent 1,328,291 issued January 20, 1920, and others, describes the simultaneous projection of deformed pictures in a manner to reconstruct normal proportions. Chretien in U. S. Patent 1,829,634 issued October 27, 1931, describes a motion picture film having some images compressed in one direction, in the manner described by Zollinger, and some not, and in Patent 1,829,633 issued October 27, 1931, he describes photographing with optical compression to utilize only a predetermined portion of the film area and projecting, as did Zollinger, to restore the picture to its original dimensions. In U. S. Patent 2,006,233, issued June 25, 1935, Chretien compresses a picture so as to provide a suitable space for the sound track and then expands the picture on projection to optically restore it, the while imposing the sound track on the selected portion and reproducing therefrom. Gerlach, in U. S. Patent 1,767,790 issued June 24, 1930, shows projection anamorphosis of sound track using a non afocal anamorphoser, namely, crossed cylindrical lenses.

The present invention provides an improved arrangement for collinear imaging of an object with different magnifications in two directions at right angles to each other. A high degree of resolution is obtained by using an afocal anamorphoser in combination with a spherical system. When the invention is applied in the printing of sound tracks a master record and a sensitized record to be printed are arranged to move in the two conjugate image planes of the spherical system and adjacent each is a gate having an aperture of a width in the direction of the axis of the record, that is to say in the direction of the travel of the moving record, much greater than the resolution obtained. Good imagery over an appreciable area is therefore necessary. The magnification in the two meridians, one along the axis of the record, and the other at right angles thereto and in the plane of the record, will be different, and will depend upon the relative velocities of travel and the relative widths of the two records.

I have found that with a nonafocal anamorphoser such as is typified in the crossed cylinder device of Gerlach, it is impossible to obtain, over an area or field a degree of definition such as is given by a good astronomical type objective for the same field. In the printing of anamorphosed sound track, various other arrangements have heretofore been proposed which limit the area of the field to be covered, or provide for imagery in one meridian only, etc.

I have discovered that by the use of an afocal anamorphoser a very much greater resolution can be obtained, thus appreciably extending the upper limit of frequencies recorded and improving the quality of the sound record. In the following I illustrate various types of afocal anamorphosers, all of them having the property, when used in the manner described, of exerting a non convergence effect, that is not altering the convergence of homocentric pencils of light. That is they alter the size but not the position of the object which they image, leaving it as it was, either at infinity, or in its same plane. They are further distinguished by not having the parts thereof separated by a spherical element or elements. They therefore do not require the spherical element to be traversed by an astigmatic pencil.

The so-called 16 mm. R. C. A. sound track, which occupies the space, otherwise given to the perforations, of a unilaterally perforate film, has a track relatively much wider, as compared with the picture, than has standard 35 mm. film. With the present invention such track can be printed on a continuous reduction printer, because of the large apertures permissible, with a relatively weak source of illumination and at great speed, and with a very high degree of definition, thus making possible high fidelity sound reproduction. Moreover a very simple mechanical change permits return from the off center sound track projection to centered continuous projection printing of the picture portion, using the same illuminating system without shift in its position. This makes possible the use of expensive apparatus for two different purposes.

The change in the relative dimensions of the object and image, as described, might be accomplished by means of any afocal anamorphoser. In describing and illustrating certain types of anamorphosers it is to be understood that this invention is not limited to the use of any particular type of afocal anamorphoser. However in order that the device shall be applicable to the printing of 16 mm. sound track where a resolution of ten to twelve thousand or more cycles per second may be required (66 per millimeter), it is necessary that the definition provided by the optical system, including the anamorphoser, be of exceptional quality. Also because of this requirement the projection distances, that is the conjugate focal distances of the optical system should not be too large. This means that the anamorphoser and associated optical elements, if of the usual type, are best designed to be quite small and occupy only a fraction of an inch of space. The anamorphoser must therefore be of a design capable of being executed with great accuracy, even when the parts are very small.

I have discovered that an anamorphoser designed according to the principles set forth in my copending application, Serial No. 694,803 filed October 23, 1935, in which three prism straight vision nondeviation anamorphosers comprising simple prisms cross achromatizing each other are described and claimed, is particularly suitable for inclusion in a system with short conjugate foci of this sort. It not only provides the degree of anamorphosis required for printing R. C. A. 16 mm. sound track from standard 35 mm. track, nearly one to two, and is of the necessary simplicity of construction, but also has optical properties particularly suitable for inclusion in an optical system where the associated spherical system which must be used is poorly corrected for astigmatic pencils such as would traverse such a system were non afocal anamorphosers used.

One could also use a cylindrical anamorphoser of the type described in my U. S. Patents 1,945,950 and 1,945,951, both issued February 6, 1934. It may be desirable however, for reasons of increasing the relative opening of the negative cylindrical member to have such an anamorphoser set for zero convergence effect on parallel pencils and hence be positioned, as is preferable with the prism anamorphoser, between two spherical systems having their principal foci in the two sound tracks. This therefore makes it desirable, in order to minimize the separation of these two spherical systems, and thus avoid increasing their openings for even moderate angular fields, that the anamorphoser be as short as possible. Since the separation of the two members, the positive and negative cylindrical lenses, of such an anamorphoser is proportional to the focal lengths of the members and greater with increase in magnification or anamorphosis, it follows that decreasing the size of the cylindrical anamorphoser decreases the focal lengths of its two members and hence increases their relative openings and the difficulty of suitably correcting the members.

Ceccarini, in U. S. Patent 1,938,808, issued December 12, 1933, and Rudolph in British Patent No. 8,512, A. D. 1898, have described anamorphosers comprising a spherical member placed between two cylindrical members, of moderate focal lengths. But in Ceccarini's device, although the astigmatism is less than in Rudolph's, the cylindrical members are relatively close to the two conjugate image planes and hence dust accumulating on them may greatly interfere with proper performance of the device. Also, being close to the image planes, the cylindrical members are comparatively far apart and cannot readily be placed in the same mount, which increases the difficulty of maintaining them with their axes precisely parallel. And in order that a cylindrical anamorphoser function with the highest possible resolution of the image, the axes of the cylinders must be maintained parallel to within a very small fraction of a minute of arc, not more than 1 or 2 seconds of arc.

In certain preferred designs of reduction printers where both the 35 mm. and the 16 mm. film are pulled down by the same drum, the axes of the two film gates are at right angles to each other and the optical train is bent at right angles with a 45° prism placed somewhere near its center. The small size of the prism anamorphoser and the difference in the two conjugate focal distances makes it possible to place the anamorphoser wholly to one side of this 45° prism. With the Ceccarini device the two cylindrical members must be placed one on each side of the 45° prism and this greatly increases the difficulty of maintaining their axes absolutely parallel in the same plane, if it does not indeed make it impossible because of the possible deviating action of the prism itself.

I have discovered that these objections can be overcome, and a slight increase in the focal length of the cylindrical members, together with a decrease in their angular openings and consequent decrease in coma can be accomplished, by placing the spherical member to the outside of the cylindrical members and to the negative cylindrical member side of the system. The positive cylindrical member is then on the side of the object to be enlarged in one dimension, and both the positive and negative cylindrical members have the same conjugate focal points, points lying on opposite sides of the system, as is the case with the afocal cylindrical anamorphoser in part described and claimed in my copending application Serial No. 35,952 filed August 13, 1935, and as is not the case with Ceccarini's device. This new arrangement therefore offers many advantages for this purpose over cylindrical anamorphosers previously described.

It has been more or less assumed, so far, that the anamorphoser is to be inserted in a reduction printing optical system so as to enlarge in one meridian an image reduced in size, as compared with the object, by virtue of the action of spherical refracting elements in the system. It should however be understood that the same end result can be accomplished by an optical system in which the greater reduction in one meridian is accomplished by the reducing action of the anamorphoser itself, functioning in the reverse sense to that first mentioned.

This may be accomplished by turning the afocal anamorphoser end for end and rotating it 90° on its axis. If it has conjugate planes at infinity the spherical elements to each side of it must be correspondingly altered in focal length to image with correct magnification in the other meridian and have foci in the object and image plane respectively. If the afocal anamorphoser has conjugate focal planes in the object (or image) then the associated spherical objective is shifted to the other side when the anamorphoser is turned end for end and rotated.

The nature and objects of the invention will be better understood from a description of particular illustrative embodiments for the purposes of which description reference should be had to the accompanying drawings in which:

Fig. 3 shows an elevation of some of the mechanical arrangements of the system whose optical train is shown in Figs. 8, 20, 22 and 24, and Fig. 4 shows a detail of the optical train of Fig. 2, and a modification of the optical train of Figs. 7, 8, 20, 22 and 24, and, Fig. 5 shows a detail of the optical train of Figs. 7, 22 and 24, and a modification of the optical train of Figs. 2, 8, and 20, and Fig. 6 shows a detail of the optical train of Figs. 8 and 20 and a modification of the optical train of Figs. 2, 7, 22 and 24.

Figure 1:
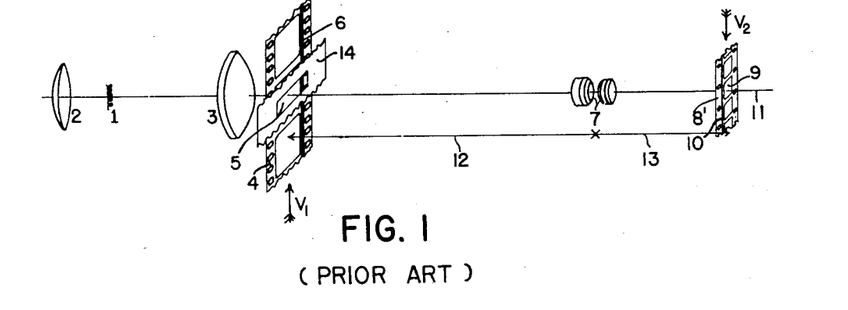
Fig. 1 is a schematic presentation of the ordinary continuous reduction printing optical train such as is found in any centered projection or printing system, and, Fig. 2 is a schematic representation of an embodiment of the invention in which there is a projection system placed eccentrically with respect to the illuminating system and comprising a modification of the illuminating system to compensate therefore.

In Fig. 1 I illustrate a reduction printing system in which 1 is a light source or incandescent filament, 2 is a mirror imaging the light source in itself, 3 is a condensing lens, preferably with one aspherical surface so as to have large opening and still be free from spherical aberration, 4 is an image bearing record strip serving as an object, here, in the case of a reduction printer, a 35 mm. negative film bearing pictures 5 and a track 6. 7 is a high quality printing lens and 8 is a sensitive image receiving record strip on which the object is imaged. In this case 8 is a 16 mm. positive film on which are imaged picture frames 9 and a sound track 10. 11 is the axis of the system, and in this case, the reduction being two and one half to one, the conjugate distances 12 and 13 from the lens 7 to the films 4 and 8' respectively are in the ratio of two and one half to one. 14 is a gate limiting the field of the object record strip 4 imaged by the lens 7. The arrows indicate the direction of travel of the films and V₁ and V₂ are their respective speeds.

In Fig. 1 the condenser 3 images the filament 1 on the axis 11 in the first principal plane of the lens 7. Since the lens 7 may be readily removed for conversion of the printer from a picture printer to a sound track printer and vice versa, it is desirable to have the light source 1, condenser 3, and film actuating system (not shown) stay fixed when such conversion is made. It is therefore necessary to provide for imaging the filament on a laterally displaced axis without moving any of the aforementioned parts.

Figures 2, 3, 4, 5, 6:
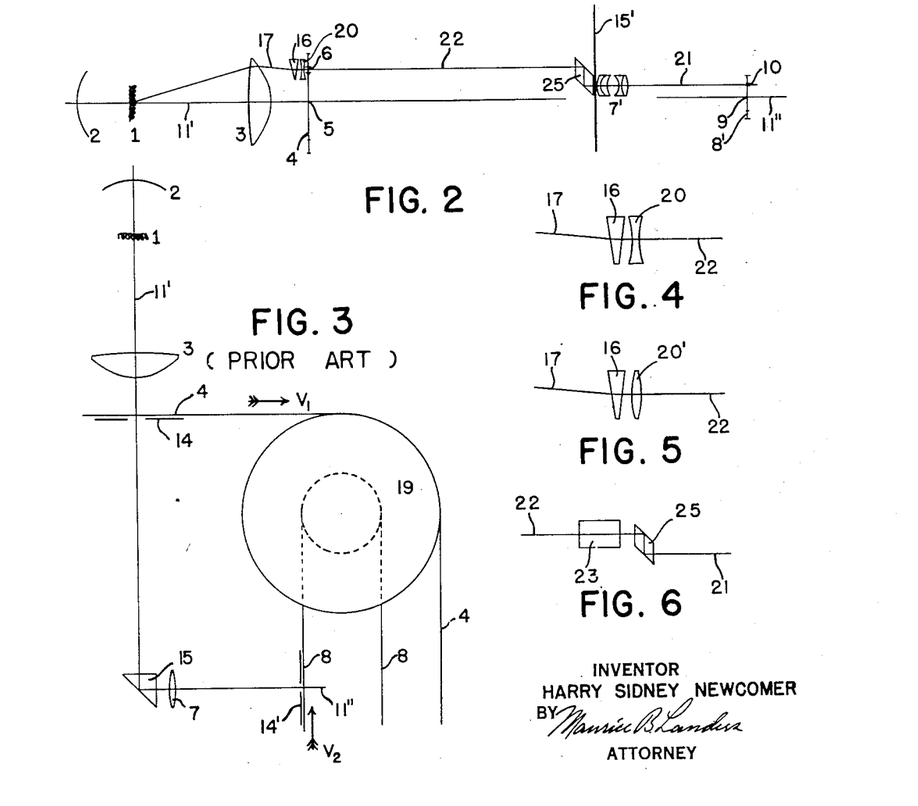

In Fig. 2 I show an arrangement of the condensing system 2, 1, 3, 16, 20 and of the projection system 25, 15', 7', which I have found has considerable advantage over the conventional arrangement of Fig. 1. With the new arrangement the condenser system and record strips or films occupy the same position as heretofore so that the mechanism supporting the one and actuating the other remain undisturbed, and yet the laterally displaced object record or sound track 6 is imaged on another laterally displaced record receiving strip, i. e. the sound track portion 10 of the film 8', with the two record strips nevertheless disposed on the optical axis of a projection or printing lens 7', and the illuminating system nevertheless imaging the light source 1 in said lens 7'. By the new arrangement I make possible the use of the condenser system without altering its position and I accomplish at the same time greatly improved definition of the laterally disposed record.

I have discovered that this can be readily accomplished by throwing into position in front of a marginal portion of the condenser 3 a small prism 16 with base out as shown in Fig. 2. This deflects the ray 17 passing through the margin of the condenser 3 so as to be parallel, as at 22, with the axis 11'. I have also discovered that along with this change it may be desirable to alter the convergence of the marginal beam through the condenser by means to be described, and shown at 20.

In Fig. 2, 1 is again the light source, 2 the mirror and 3 the condensing lens. 7' is a printing lens placed on an axis 21 different from that of the condensing system and axially disposed with respect to the laterally placed record receiving strip, in this case a sound track 10 on the 16 mm. positive film 8'. The axis 21 of the lens 7' and the center line of the record receiving strip or sound track 10 are therefore displaced to one side of the axis 11" passing through the center line of the 16 mm. film 8'. 1" is or may be an optical continuation of the axis 11' of the illuminating-condenser system. The axis 22 is an optical continuation of the axis 21, but laterally displaced from it by means of the rhomboid prism 25 so that it passes through the center line of the laterally displaced image bearing record strip or 35 mm. sound track 6.

In the case of RCA sound track the lateral displacement or distance between the axes 11" and 21 is 0.257". The axis 22, in the case of sound track on standard 35 mm. film, is 0.4455" from the axis 11' passing through the center line of the film. Therefore the distance between the axes 21 and 22 is, in this example, 0.1885" and is secured by means of a rhomboid prism 25 of this length.

Since the optical focal distance between the films 4 and 8' of Fig. 2 is greater than it was in the original picture printing arrangement of Fig. 1 along the axis 11, and since the condenser should still image the filament in the first principal plane of the lens 7', and since the illuminating system is fixed, displacement of the filament image along the axis must or should be accomplished. I have found that this can be done either by suitably choosing the focal length of the lens 7' so as to image the sound track 6 on the sound track 10 with the required magnification, and displacing the image of the filament with a weak negative lens 20 mounted with the deflecting prism 16 as in Figs. 2 and 4 where the other numerals refer to parts already described. Or one may reduce the optical distance along the axis 22 by placing on it a solid glass cylinder, plate, or equalizer with plane parallel ends as shown at 23 in Figs. 2, 6, 8 and 20 and having a thickness such that the reduction in optical path brings the image of the filament into the first principal plane of the lens 7'. In fact, since in a mechanical device of high precision, such as a reduction printer, the two gates 14 and 14' (Fig. 3), that is the planes of the two films 4 and 8 almost necessarily occupy fixed positions, and since the focal length of the lens 7 or 7' etc., can never be made exactly to dimensions, it may properly be made somewhat short and a glass equalizer, as at 24, Fig. 8, used to compensate in both systems, (Figs. 1 or 2) being made in each case to compensate the particular lens 7 or 7' employed.

Figures 20, 21, 22:
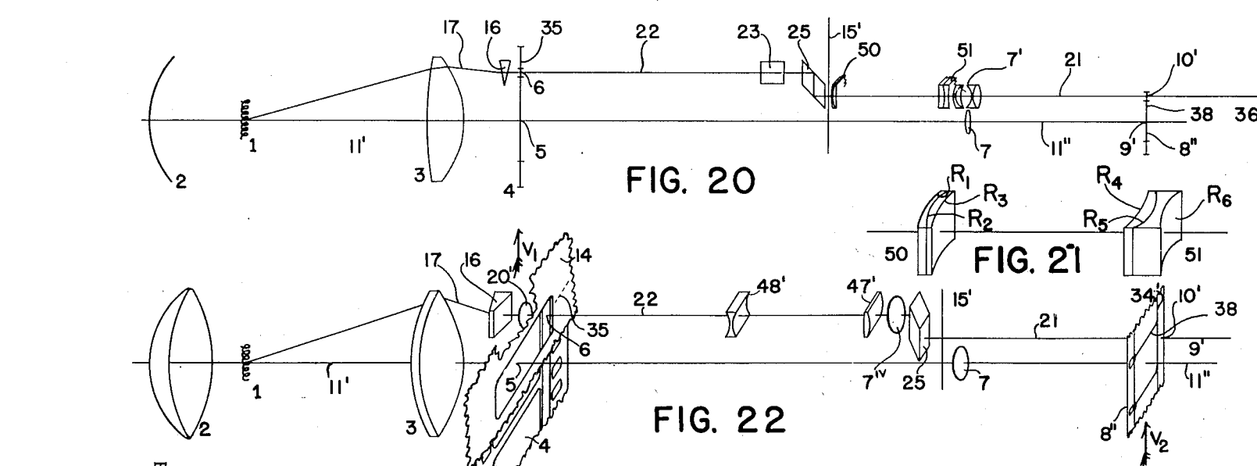
Fig. 20 is a diagram of a continuous reduction printing optical train comprising an axial system for printing the picture and an eccentrically placed projection system for printing the sound track in which is placed an afocal cylindrical anamorphoser having conjugate image planes in the image bearing strip which strip is the one situated on the side of the positive cylindrical member as in Figs. 15 and 19, wherein the positive and negative cylindrical members are corrected for spherical aberration according to the invention.
Fig. 21 shows in perspective the afocal anamorphoser of Fig. 20
Fig. 22 shows in like perspective a continuous reduction printing optical train comprising an axial system for printing the picture and an eccentrically placed projection system for printing the sound track in which is placed a single spherical lens and an afocal cylindrical anamorphoser with the negative cylindrical lens furthest from the spherical lens and having conjugate image planes in the image bearing strip and operating to produce in a meridian parallel to the length of the image bearing and receiving strips and in the plane of the image receiving strip a reduced image of the image bearing strip.
Figure 24:
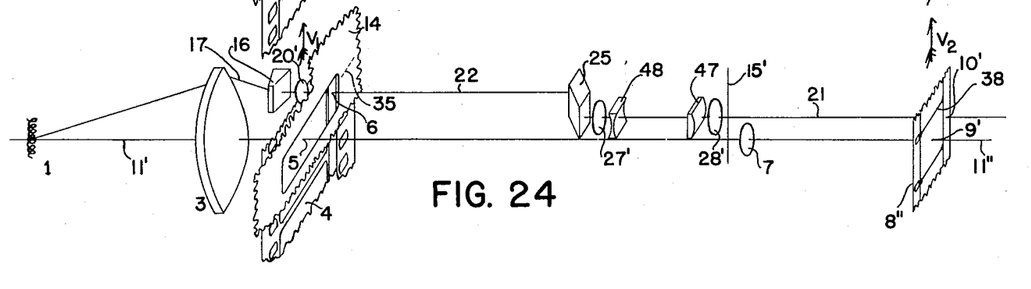
Fig. 24 shows a similar system to that of Fig. 22 in which the afocal cylindrical anamorphoser has conjugate image planes at infinity and is placed between two spherical systems with principal foci in the image bearing and image receiving strips respectively as shown in Fig. 14.

In Fig. 5 I show an alternative arrangement in which, where for any reason the lens 7' is placed much nearer the object 6 and the condenser 3, the focal length of the marginal condenser rays can be shortened with a positive lens 20' used in conjunction with the prism 16. This use of 20' is also shown in Figs. 22 and 24.

Figure 7:
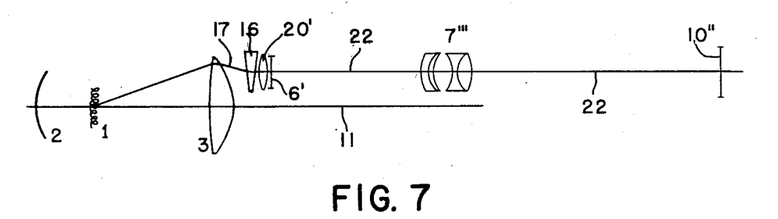
Fig. 7 shows a modification of Fig. 2 utilizing the aperture refracting system of Fig. 5 in an arrangement with the condenser system eccentrically placed with respect to the projection train.

I have discovered that this employment of deflecting prism 16 and an equalizing or aperture lens 20 or 20' (Figs. 2, 4, 5 and 7) is of great advantage wherever it is desired to image a small off center record with an off center lens with its axis on the center line of the record. The advantage of this arrangement is well shown in Fig. 7 where 11 is the axis of the illuminating-condenser system as heretofore described and 22 the axis of the projection lens 7''' imaging the object 6', centered on the axis 22, in 10" and at any desired distance away. The positive lens 20' (Fig. 5) or the negative lens 20 (Fig. 4) may be used to cause the beam deflected by the prism 16 of Fig. 7 to focus at the proper place in 7''', being chosen so as to compensate for 7''' being at a different distance from that for which the condenser system 1, 3 was designed.

In the reduction printer arrangement diagrammed in Fig. 2, the two films 4 and 8 are both pulled by two concentric integral drums of different diameters shown at 19 in Fig. 3, thereby to increase the accuracy of their relative rates of travel and to simplify the mechanical construction of the driving apparatus. This is best accomplished, as indicated in Fig. 3 by placing the axes 11' of the condenser object system 1, 2, 3, 4 and 11" of the printing lens image system 7, 8 in the same plane but at right angles to each other by means of the 45° prism 15. In Fig. 3 14 and 14' are the printing gates of the two films 4 and 8. For the reduction printing of 16 mm. film the ratio of the diameters of the two drums 19 is as two and one half to one.

In Figs. 2, 8, 20, 22 and 24, 15' indicates the location of a prism similar in function to the prism 15 of Fig. 3 and the axis 11' is at right angles to the axis 11" and lies in a plane perpendicular to the paper passing through 11". Because of the mirror action of the prism 15 or 15', the two films travel in the same direction as indicated by the arrows in Figs. 3, 22 and 24 and not in opposite directions as indicated in Fig. 1. But the two sound tracks of the films in Fig. 3 could be on opposite sides of the axis 11' and 11" and therefore, because of the reversed direction of travel, the 16 mm. track would be oppositely placed to that of the track 10 of Fig. 1. Its position in an apparatus such as Fig. 3 is given at 10 in Fig. 11 which shows the positive with emulsion side up.

Figures 8, 9, 10, 10A, 10B, 11, 11A, 12, 13, 14, 15, 23:
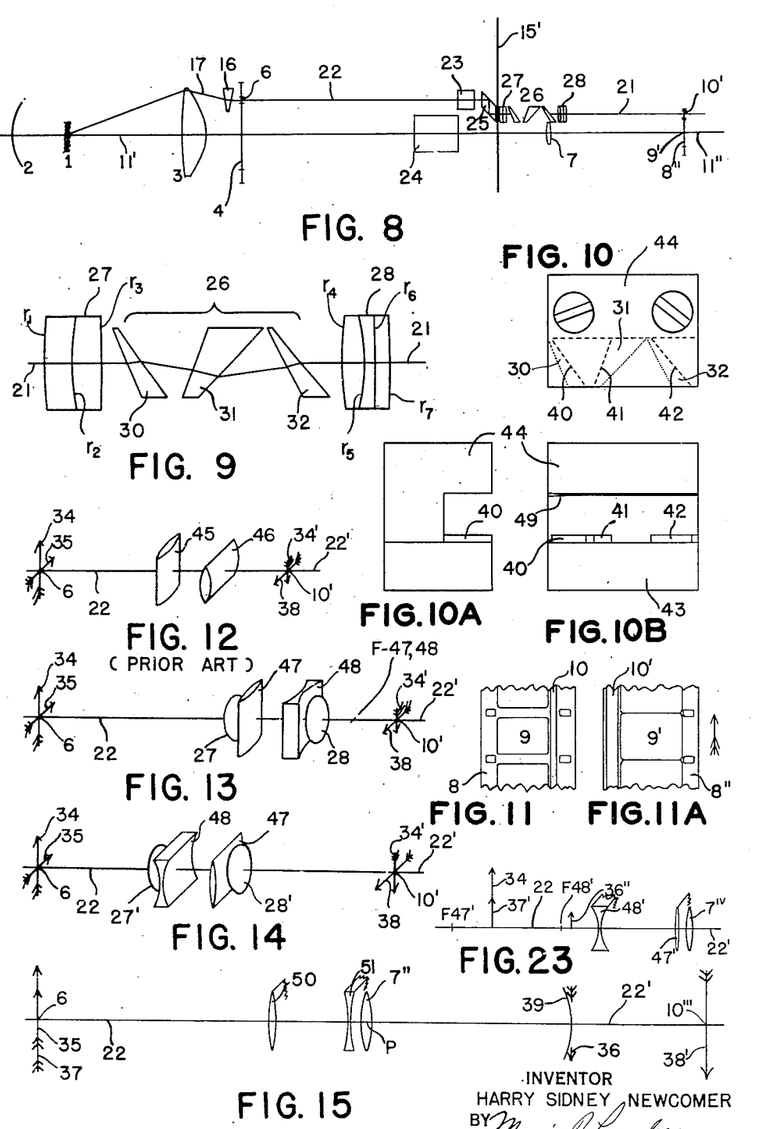
Fig. 8 shows a modification of Figs. 2 and 7 in which an afocal anamorphoser is introduced into the eccentrically placed optical train or projection system.
Fig. 9 shows a detail of a preferred afocal anamorphosing system with its associated spherical objectives.
Figs. 10, 10A and 10B show a device for securing the prisms of Fig. 9 in correct alignment.
Fig. 11 shows diagrammatically the change in lateral dimensions of the imaged strip using an anamorphoser, as compared with the dimensions as illustrated in Fig. 11A such as would be obtained in straight reduction printing without anamorphosis.
Fig. 12 shows a conventional non afocal projection printing anamorphoser providing collinear imagery only over a relatively restricted field.
Fig. 13 shows an alternative afocal anamorphosing collinear imaging system using cylindrical elements.
Fig. 14 shows the same anamorphoser placed to function in the reverse sense in the opposite meridian, the reduction in magnification in this meridian being principally due to the anamorphoser.
Fig. 15 shows another cylindrical afocal anamorphosing collinear imaging system with a single spherical objective outside of and to the negative element side of the anamorphoser.
Fig. 23 shows a diagram of the anamorphoser of Fig. 22, it having conjugate image planes in the object or imagé bearing strip which object is situated on the side of the negative cylindrical member, together with an associated spherical system.

RCA standard 16 mm. track is however printed on the other side as shown at 10' in Fig. 11A. It is also shown on this side at 10 in Fig. 2, although it is there further from the film edge than is standard RCA 16 mm. track.

In the device so far described and shown in Fig. 2 the track 10 is $\frac{1}{10}$ as wide as the track 6. The two films move in this ratio and the imagery of the one in the other has to be in the same ratio if the gates are to be kept with large enough apertures to permit rapid printing. Therefore it becomes necessary to enlarge the image 10 in a direction transverse to the axis of the track so as to bring the width of this track up to that of standard RCA 16 mm. sound track. As herein already discussed, this requires the use of an anamorphoser, and I have discovered that for satisfactory results because of limitation of space and requirements as to resolution and for other reasons already mentioned, this anamorphoser must be compact, simple and easy to make with great precision, free from the usual axial and abaxial errors, and adaptable to transmitting oblique pencils from a sufficiently large angular field.

To meet these conditions I have discovered that the three prism straight vision non deviation prism anamorphoser of the type described and claimed in my copending application Serial No. 694,803 is very suitable. The prisms can be made in minute dimensions, about 6 mm. high, with great precision. They can be mounted against accurately milled faces of a supporting block so as to be correctly oriented and so cemented and clamped in position. They are so light that there is then no tendency for them to become displaced. The following are the angles and glasses for an achromatic prism anamorphoser as shown at 26 in Fig. 8 and in greater detail as prisms 30, 31 and 32 of the unit 26 of Fig. 9 and magnifying 1.94.

|  | Prism number | | |
| --- | --- | --- | --- |
|  | 30 | 31 | 32 |
| $n_d$ | 1.5606 | 1.6236 | 1.5800 |
| Abbe number | 61.2 | 56.9 | 53.7 |
| Apex angle___________degrees__ | 12.5 | 22.24 | 12.32 |
| Angle between front face and axis__do____ | 54.66 | 47.38 | 50.28 |
| Angle between back face and axis__do____ | 67.16 | 69.62 | 62.60 |

The width transverse to the axis of this prism anamorphoser is 0.244". At the top of the V the separation between the adjacent faces of prisms 30 and 31 is 0.302". At the bottom of the V, that is at the nearest point, the separation between the non adjacent faces of prisms 31 and 32 is 0.214". The total length of the anamorphoser is 0.748".

This prism anamorphoser is achromatic $d$ to $g$, has substantially equal magnification for oblique rays inclined to either side of the axis, and because of the spacing and angles of the prisms also has an axial incident ray exit along the same axis, as shown at 21 and 21 in Fig. 9.

This prism anamorphoser thus comprises three prisms arranged transverse to an optical axis and separated from each other by air spaces, of which the front prism is situated at the image expansion end of the anamorphoser, the end facing the larger image, and of which the back prism is situated at the image reduction end of the anamorphoser, the end facing the smaller image or the image reduced in size by virtue of the action of the anamorphoser, in which the front and back prisms are substantially the same strength and have their bases lying on one side of the optical axis and the intermediate prism is of substantially twice that strength and has its base lying on the opposite side of the optical axis, the front face of the front prism making an angle with the optical axis which is substantially as small as or smaller than the angle between the front face of the back prism and said axis, the front face of the intermediate prism making an angle with the optical axis substantially as small as or smaller than the aforementioned angles.

The achromatism of this prism anamorphoser is obtained by making the Abbe number of the front prism less than that of either of the other two prisms, and that of the center prism intermediate in value between that of the front and back prisms. In fact as shown in the patent application, the Abbe number of the front prism is less than that of the back prism by an amount approximately equal to one unit for each 5/100 above unity of the square root of the magnification.

In Figs. 10, 10A and 10B I show a mechanical drawing of a mount or holder of metal or Bakelite or other suitable material for the prisms of Figure 9. I have discovered, what was not obvious at first, that ledges accurately milled to the angles given as shown at 40, 41 and 42 on the block 43, can be used to secure and precisely orient the prisms 30, 31 and 32 (shown by dot and dash lines in the plan view only, Fig. 10). Once placed in position they are sufficiently fixed by a tiny drop of ambroid and then clamped in position with the cover block 44. This clamping may, I have found, be successfully accomplished by the use of a thin gasket of paper or thin card board or other suitable material placed on the face of the clamping block 44 as shown at 49, Fig. 10B. This serves to fix the prisms firmly, accomplish the orientation with great precision, a result otherwise apparently impossible because of the small dimensions of the parts.

Non collimated pencils traversing prisms do not remain homocentric and would require restoration of homocentricity with suitable optical means, such as a cylindrical lens. It is therefore desirable to avoid introduction of astigmatism into traversing pencils by collimating them. There should therefore be placed to each side of the prism anamorphoser of Figs. 8 and 9 a spherical imaging system, each with a principal focal length equal to the respective optical distances of the object and image planes, that is the planes of the two record strips or sound tracks. This separation of the two optical systems, if great enough, results in one of them vignetting oblique pencils through the other. The prism anamorphoser can be made so short however, that this effect is not objectionably present.

In this example the shorter focal length lens, 28 of Figs. 8 and 9, has a focal length of 45 mm. and an opening of about 6 mm. The other lens, 27 therefore has a focal length of 112.5 mm. and the same opening.

The lens 27, having a relatively small opening and field, can be a lens of the astronomical type, corrected primarily for spherical aberration. In order to also decrease the sine error and the astigmatism of pencils from the margin of the field, I have chosen the outside radius short, less than half the focal distance. The following are the constants of this cemented doublet having particularly small errors F to g, and corrected for spherical aberration of the glass distance in the prism 25 and the equalizer plate 23:

$r_1$ +46.62 mm.
thickness 2.30 mm. $n_d$ 1.6262, Abbe number 39.1
$r_2$ +22.78 mm.
thickness 2.55 mm. $n_d$ 1.5188, Abbe number 58.6
$r_3$ —575 mm.

The lens 28 having a relatively larger opening and field, and a high degree of marginal correction being desirable, I have discovered that it is advantageous to construct it as simply as possible and still be free of errors under these conditions, by making it a cemented triplet with the following constants. This gives it an exceptionally good astigmatic correction over the utilized field.

$r_4$ +28.18 mm.
thickness 1.875 mm. $n_d$ 1.5726, Abbe number 57.2
$r_5$ —16.56 mm.
thickness 0.937 mm. $n_d$ 1.6217, Abbe number 36.1
$r_6$ —141.3 mm.
thickness 1.20 mm. $n_d$ 1.5726, Abbe number 57.2
$r_7$ —123.29

Figs. 11 and 11A illustrate the enlargement of the track produced by this anamorphoser, Fig. 11A being unanamorphosed track and Fig. 11 anamorphosed track. At 8 there is shown a 16 mm. film bearing picture frames 9 and a track 10, both a miniature of the standard 35 mm. film. The track is about 0.034" wide instead of 0.084" wide as in standard film. It is spaced with its center 0.174" from the center line of the film. In the drawing, for reasons already discussed, the track of this positive film, emulsion side up, is shown to the opposite side from what it would be if it were conventionally imaged from standard 35 mm. film. At 8' there is shown a piece of 16 mm. RCA positive sound film with unilateral perforation, the position of the other usual perforation being occupied by the sound track 10', which track is 0.065" wide and spaced with its center 0.257" from the center line of the film. The emulsion side is up. The arrow indicates the direction of travel of both films.

Instead of the afocal prism anamorphoser of Fig. 8 I have discovered that for the reasons previously pointed out I can use an afocal cylindrical anamorphoser of the type described in my Patents 1,945,950 and 1,945,951 in which the two cylindrical members have axes parallel and are spaced a distance apart equal to the difference between their absolute focal lengths, whereby the second focal point of the convergent lens coincides with the first focal point of the divergent lens, the ratio of the focal lengths determining the magnification. Such lenses can be given good corrections for an opening of the positive lens equal to about f/6, or for the present purposes a focal length of 36 mm. The negative lens then has a focal length of 18 mm. and an opening of f/3. While this comes substantially within the limits of the dimensions of the prism anamorphoser first described, the openings are relatively much larger than for the associated spherical system and suitable corrections more difficult to obtain. To this is added, because of the small size and short focus of the cylindrical numbers the great difficulty of orienting them with their axes precisely parallel to within a few seconds of arc. The focal lengths can be increased, but only at the expense of the anamorphoser occupying more space. The cylindrical members 47 and 48 might be of the same design as given and claimed in the Patents 1,945,950 and 1,945,951.

Fig. 13 shows schematically such an anamorphosing printing system in which 6 is the object bearing record strip, the latter indicated in this case by arrows in the two principal meridians. Thus as in the illustrative example previously described, 6 is the center line of the 35 mm. sound track, 34 is the axis of the track and 35 is the transverse dimension of the track.

The spherical lens 27 has its principal focal point at 6 and the spherical lens 28 has its principal focal point in the axial point of the image receiving record strip at 10'. In the illustrative example this is the 16 mm. RCA track, 34' being the axis of the track, shown reduced to one to two and a half as compared with the 35 mm. track 34. The reduction is accomplished by means of the ratio of focal lengths of the spherical lenses 27 and 28. The transverse dimension of the RCA track is given by the arrow 38.

These two spherical lenses 27 and 28 collimate the pencils in the space between them and the afocal anamorphoser comprising the positive and negative cylindrical lenses 47 and 48, with axes parallel and common focal point F—47, 48, therefore has its conjugate focal planes in a common point at infinity.

The common focal point F—47, 48 is shown proximal to the image receiving record strip 10', but as above stated it can be further away from the cylindrical lenses, and indeed, beyond the record strip 10'. As a result of the action of the afocal cylindrical anamorphoser 47, 48 the object dimension 35 is imaged at 38 larger than is the object dimension 34 at 34'. In the figures 22 and 22' are the axis of the system to its two sides.

Fig. 12 illustrates the crossed prism non-afocal anamorphoser of Gerlach, comprising two positive prisms 45 and 46 with axes perpendicular to each other. The other reference characters of the figure indicate structures the same as or similar to those shown in Fig. 13. However, as previously discussed, although this device seems to be a very simple and obvious means of accomplishing the desired result it does not accomplish it with image quality equivalent to that obtained with afocal anamorphosers as herein described. The crossed cylindrical system is simple but the area of the track 6 must be substantially restricted in at least one dimension if the imagery is to be good enough to be useful. Otherwise the crossed cylinders produce serious unavoidable aberrations.

I have discovered that it is not necessary that the anamorphosis take place in the plane perpendicular to the track. Since the width of the two tracks is nearly the same, as 84 mils is to 65 mils, the spherical system can be designed to have conjugate foci in the two tracks in this magnification ratio and the additional reduction necessary in the meridian parallel to the axis of the tracks can be obtained in the required amount by having the active plane of the anamorphoser in this plane.

Thus the expansion end of the anamorphoser, that is the end facing the larger image produced by it, can face the image bearing record strip or 35 mm. track instead of the 16 mm. track, and the reduction end of the anamorphoser, that is the end facing the smaller of the images produced by it, can face the image receiving record strip or 16 mm. track.

Thus in Fig. 14, the object bearing record strip and the image receiving record strip are the same as, and are referenced with the same numerals as in Figs. 12 and 13. 27' and 28' are the two spherical lenses with principal foci in 6 and 10' respectively and having focal lengths in the ratio of the width of the two record strips. 47 and 48 are positive and negative cylindrical lenses as in Fig. 13, comprising an afocal anamorphoser with conjugate focal planes at infinity and designed as described in the aforementioned Patents 1,945,950 and 1,945,951. The axes of the cylinders are perpendicular to the axes of the two films and the expansion end faces the 35 mm. track 34 and the reduction end the 16 mm. track 34'.

As already indicated, in place of the cylindrical anamorphoser 47, 48 of Fig. 14, one might substitute the afocal prism anamorphoser 30, 31, 32 of Fig. 9, but turned end for end so that its expansion end faces the image bearing strip 34 and is oriented to be active in the plane of 34.

This arrangement of the anamorphoser tends to equalize the focal lengths of the lenses 27' and 28'. This permits decreasing the sum of the focal lengths somewhat, and hence increasing the space for the anamorphoser. This again permits increasing the focal lengths of the cylindrical lenses of the cylindrical anamorphoser. It also decreases the maximum field angle. All of these changes facilitate improvement in image quality.

Fig. 24, presently to be described, shows the anamorphoser arrangement of Fig. 14 included in an optical train comprising the other elements of a reduction printer according to the invention.

The afocal anamorphoser of Fig. 15, presently to be described, may also be used with its active plane in the meridian parallel to the axis or length of the record bearing strip or film. It then functions as does the anamorphoser of Fig. 14 to take a substantial part in the reduction in length from 35 mm. to 16 mm. film length. The axes of its cylindrical lenses are in this arrangement then placed perpendicular to the axis of the track, and it is turned end for end along with the spherical element 7'' so as to have its expansion end face the image bearing record strip or 35 mm. film. The spherical element 7'' is thus transposed to still remain next to the negative cylindrical element 51 and exterior to the anamorphoser. The anamorphoser members will then, for equivalent magnification, be closer spaced and their focal lengths will be less, about half as great as in the example below for Fig. 15.

I have discovered that the objects of the invention can be satisfactorily accomplished and that the focal lengths of the cylindrical members can be substantially increased over that possible in the design of Figs. 13 and 14 by a radically different design as shown in Figs. 15, 16, 17, 18, 19 and 20. Thereby also the relative openings and angular fields are decreased.

Figure 16:
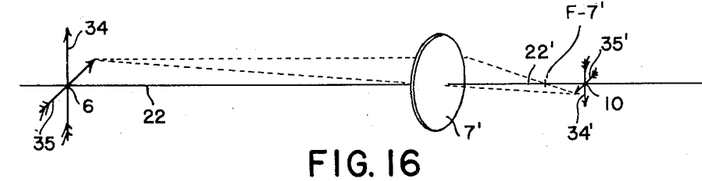
Figs. 16, 17, and 18 show component parts of Fig. 19 and detail, step by step the manner in which an anamorphoser similar to that of Figs. 15, 20 and 21 functions.

In the Figs. 15 to 19 the record strip reference numerals have the same significance as the same numerals in Figs. 13 and 14. In order to simplify the description, Fig. 16 is drawn to show the imagery of one record strip in the other with reduction in size in both meridians of one to two and a half using only the spherical lens system 7' whose principal focal point is at F—7'.

Figure 17:
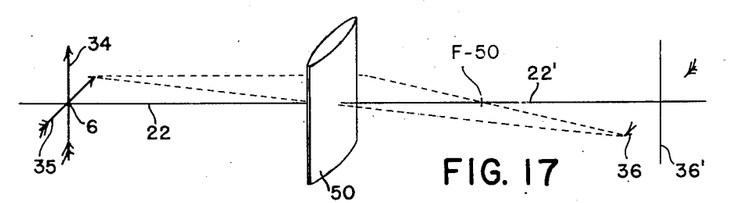

Fig. 17 shows the same object bearing record with axial point at 6, the spherical objective for the purposes of exposition being withdrawn. The first cylindrical member of the anamorphoser is inserted. It is a positive cylindrical lens 50 with conjugate focal points or lines in the plane of 6 and 36', where 36' is the image of 34 and 36 represents, by its length, the magnification of 35 produced by the cylindrical lens. F—50 is a principal focal point of the lens 50.

In the Figs. 16–19, 36' is located beyond the locus of the image plane 10 and or 10'. This is preferably the case for the illustrative example, of reduction two and one half to one in the inactive meridian of the anamorphoser and magnification due to the anamorphoser of nearly one to two. In Fig. 15, where the magnification due to the spherical lens 7'' is greater, the axial point 10''' of the image receiving record may lie, as shown, beyond the conjugate plane 36.

In the illustrative example, it is readily seen that it is desirable to place both cylindrical lenses as close to the spherical lens as possible and also thus give them as long focal lengths as possible. Otherwise, as will be seen from a study of the construction details, the cylindrical lenses can both be decreased in focal length. They could be appreciably relatively increased in focal length only if the spherical lens could be moved further from the object, that is for instance the magnification in the other meridian changed.

In Fig. 15 where the image plane 10''' is further away from the spherical lens 7'', the magnification produced by the lens 7'' being then greater, the conjugate image 36 comes inside the image plane 10'''.

Figure 18:
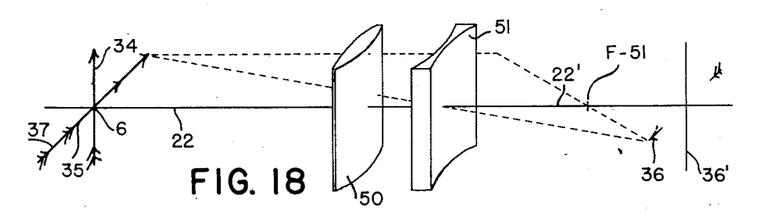

In Fig. 18 I show the next step in construction, namely, the introduction of a negative cylindrical lens 51 with axis parallel to that of the lens 50 and principal focal point at F—51. The lens 51 is so chosen, both as to focal length and position, that the lines 36' and 34 are conjugate focal lines of it as well as of the lens 50. In other words, the lens 51 forms a virtual image of 36' in 34, the magnification being indicated by the length of the arrow 37.

Figure 19:
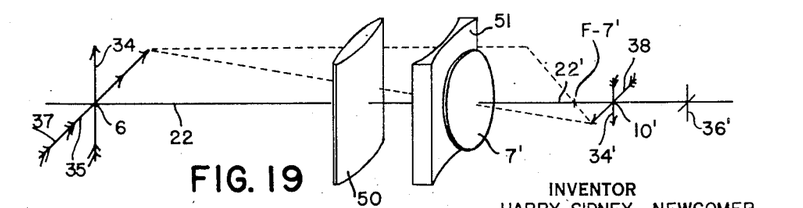

The next step, which completes the construction, is shown in Fig. 19 or 15, where the spherical lens 7', or 7'', is inserted in the system so as to image the enlarged virtual image 37 in 38 of Fig. 19 or 38' of Fig. 15 situated in the image receiving record plane 10' of Fig. 19 or 10''' of Fig. 15.

By way of example the spherical lens 7' of Fig. 19 might be the spherical lens 7' of Fig. 2 and have a focal length of 32.14 mm. with conjugate foci 112.5 mm. and 45 mm. The positive cylindrical lens 50 could have a focal length of 44.44 mm. and conjugate focal distances to 6 and 36 of 80 mm. and 100 mm. respectively. In order that the magnification due to the anamorphoser be 1.94, the distances of the negative cylindrical lens from 6 and 36'' should be 109.5 mm. and 70.5 mm. respectively. The focal length of the negative lens 51 is therefore 42.89 mm.

The afocal anamorphoser or opposed plane anamorphoser 50, 51 of Figs. 15 to 19 is thus distinguished by having its conjugate image planes in the same plane, as with other afocal anamorphosers, but with each individual cylindrical member having conjugate image planes on opposite sides of the anamorphoser and not on the same side. Also the associated spherical system is outside the anamorphoser and on the negative member side thereof.

The advantages of this anamorphoser have been in part set forth. It is distinguished from other afocal cylindrical anamorphosers in one very important particular, namely relatively great magnification is possible with relatively long focal lengths and close approximation of the two members.

It is not only adapted to securing considerable magnification, but when used to image relatively small fields as in the illustrative examples herein shown, correction of the members for spherical aberration only much improves the imagery. Moreover the anamorphoser is particularly adapted to the use of a gate or stop at or near the negative member. Thus the axial point of the spherical lens as at P, Fig. 15, or indeed in practice, of the negative lens, may be the location of the stop. The negative lens, in view of its relative opening, can then properly be corrected for spherical aberration for its conjugate focal points 6 and 36. It will have a curved tangential image field as shown at 39. As set forth in my copending application Serial No. 35,952, a spherical correction of the cylindrical member 50 for a conjugate point in the stop P will substantially correct for coma and create suitable curvature of field of its image surface at 39 so that the two image surfaces, of the negative and positive cylindrical members will be substantially coincident in 39. The virtual image 37 will then be substantially flat or can be made slightly concave toward the optical system to partially compensate for a like curvature of the image field of the spherical lens.

Such a corrected afocal cylindrical anamorphoser is illustrated in Figs. 20 and 21 at 50 and 51 and where in Fig. 20 the other reference characters have the same significance as heretofore. The positive cylindrical lens 50 is a cemented doublet substantially free from spherical aberration in both directions and for the conjugate focal point P (Fig. 15). It is also substantially achromatic, $d$ to $g$, in both directions and has all its surfaces concave toward the negative cylindrical lens so as to minimize the curvature of its tangential field and its other aberrations when the stop is at P. Actually, since the form is fixed to be concave toward the negative lens, there is a slight amount of residual spherical aberration, being somewhat over corrected for the principal focal point on the convex side and somewhat under corrected for the principal focal point on the concave side, that is toward the side facing the negative member of the anamorphoser. These two corrections therefore balance out to an approximately perfect correction for the intermediate position of the conjugate focal points. The crown glass faces the negative member and has both surfaces concave toward it. The lens has a focal length of 44.44 mm. and radii and constants as follows:

$R_1 = +13.289$ mm.
thickness 0.443 mm. $n_d$ 1.60801
Abbe number 46.2
Barium Flint $R_2 = + 6.792$ mm.
thickness 1.181 mm. $n_d$ 1.50454
Abbe number 67.0
Phosphate Crown $R_3 = +59.065$ The negative cylindrical lens 51 is likewise substantially corrected for spherical aberration and color in both directions and its field flattened and coma substantially reduced. To accomplish this it is given the following constants, the focal length being 42.89 mm.

$R_4 = -135.337$ mm.
thickness 1.400 mm. $n_d$ 1.60801
Abbe number 46.2
Barium Flint $R_5 = - 10.267$ mm.
thickness 1.307 mm. $n_d$ 1.56870
Abbe number 63.0
Phosphate Crown $R_6 = + 25.200$ mm.

The negative cylindrical member is composed of such glasses and so formed as to be substantially free of spherical aberration in both directions, actually being somewhat under corrected for the principal focal point on the least concave side, the side facing the positive member of the anamorphoser, and that of the longest conjugate focal distance, and somewhat less over corrected to the other side, the side of the shorter conjugate focal distance. The result is an approximately perfect correction for the intermediate position of these two conjugate focal points proportionate, as to distance, to the under and over corrections for the principal focal points. The negative member has its flint glass facing the positive member and both surfaces concave toward it. In both members the spherical correction includes color $d$ to $g$.

The form and relative positions of the members of this anamorphoser are shown at 50 and 51 in Fig. 21 where the R's refer to the surfaces having radii whose numerical size is given above.

In Fig. 20 I show at 50 and 51 the two members of this anamorphoser placed in association with a photographic objective 7', as in Fig. 19, and the whole placed in an optical train comprising a light source 1, a mirror 2 imaging the light source 1 in itself, a condenser 3, all on an axis 11' on which is centered a 35 mm. film image frame 5 borne by a film 4, and which axis 11' is optically continuous with an axis 11'' through the intermediary of a right angle prism indicated by the line 15'. On the axis 11'' there is a photographic objective 7 imaging the picture 5 in the pisture 9 on the 16 mm. film 8''. On an axis 22 displaced to one side of the axis 11' there is a refracting prism 16, a sound track 6, an optical convergence compensating block 23, a light deflecting element or rhomboid prism 25, a right angle prism indicated by the line 15' and the anamorphoser 50, 51 and its associated positive spherical imaging system, all on an axis 21 passing through the center of a record receiving strip or 16 mm. sound track 10'. The afocal anamorphoser 50, 51 has conjugate image planes or lines in the record bearing strip 6 and each member thereof has, as a plane conjugate to 6, the plane 36 situated to the other side of the anamorphoser from the image bearing record strip 6. The lines 35 and 36 are in the plane of magnification of the anamorphoser.

The afocal cylindrical anamorphoser which I have thus described has conjugate image planes in one and the same object plane. This is also true of another type afocal cylindrical anamorphoser as shown in Figs. 22 and 23 where the anamorphoser is shown operating to reduce, in one meridian, the dimensions of the object. In this respect Figs. 21 and 23 therefore correspond to the imagery of Figs. 14 and 24. In Fig. 23 the structural details of this anamorphoser are shown. It comprises a negative cylindrical lens 48' with focal point at F—48' between it and the object plane 34, and imaging 34 in 36'', and a positive cylindrical lens 47' with focal point at F—47' beyond F—48', but not necessarily beyond 34, imaging 36'' in 37' in the plane of 34. Actually 36'' measures only the magnification, the imaged lines being perpendicular to 36''. The reduced image 37' of 34 is then reimaged by the spherical lens 7$^{IV}$ in a record receiving plane 34' as shown in Fig. 22 and also Figs. 12, 13 and 14, etc.

This system might also be turned end for end and rotated 90° about its axis so as to function in the sense of Fig. 13. In either case the focal length of the negative element 48' is comparatively short. For the magnifications of the illustrative example it is, however, most advantageously placed in the meridian as indicated in Figs. 22 and 23.

Fig. 22 shows this anamorphoser in position in an optical train of a reduction printer as described. Here there is shown in perspective the anamorphoser acting in the plane of the axis of the record strip 6 to accomplish most of the reduction in length from the image bearing record strip 6 to the image receiving record strip 10'. All of the parts except the anamorphoser and its spherical lens are the same as in Fig. 20 and are designated with the same numerals, except that instead of a compensating plate 23 there is a positive aperture lens 20' which serves to focus the beam form the illuminating system 1, 2, 3, 16 in the less distantly positioned spherical lens 7$^{IV}$. Also the motion picture films 4 and 8'' and the wide gate 14 (about 2 to 4 mm.) are shown in perspective. The arrows indicate the direction of travel.

Fig. 24 shows exactly the same type of imagery or anamorphosis in the same optical train of a reduction printer but using an anamorphoser as described in Fig. 14. The anamorphoser 47, 48 comprising a positive and negative cylindrical lens with axes parallel and conjugate image planes coincident at infinity, is positioned between two spherical lenses 27' and 28' having their principal points in the image bearing record strip 6 and the image receiving record strip 10' respectively.

In both Figs. 22 and 24 the lens 7 positioned on the axis 11' of the illuminating system 1, 2, 3, images the picture 5 of the 35 mm. film in the picture area 9' of the 16 mm. film. The anamorphosing system and optical train is placed on another axis 22, 21 to one side of the axis 11'. 38 and 35 indicate the meridian transverse to the plane of magnification (reduction) of the anamorphoser. In Fig. 22 34' is in the meridian of magnification (reduction) of the anamorphoser.

The foregoing particular description is illustrative merely and is not intended as defining the limits of the invention. Whereas certain specific afocal anamorphosers are described, it is not intended that the invention be limited to the use of any particular afocal anamorphoser to accomplish the printing of a sound track with different magnification in two different meridians and high resolution of the image throughout, nor is it intended to limit the invention either as to the degree of anamorphosis or difference of magnification in the two meridians. The particular anamorphosers and arrangements shown and described however offer certain specific and definite advantages and are preferred. It is also not intended to limit the invention to the application of such systems to imaging thus in two planes at finite distances to sound track printing, either of 16 mm. or other film.

This application is a continuation in part of my applications of Letters Patent, Serial Nos 694,-803, filed October 23, 1933, and 35,952, filed August 13, 1935. It describes in part certain improvements over arrangements shown in said applications.

I claim:

1. A collinear imaging system for continuous printing of an image strip wherein the magnification is different in two meridians, one parallel to the axis of the strip and one at right angles to this axis, comprising two optical trains having two parallel optical axes, including a source of light and a condensing system on one optical axis, a refracting prism, a record strip bearing an image serving as an object and a relatively wide gate on the second optical axis parallel to the first mentioned axis, a light deflecting element, afocal anamorphoser and spherical imaging system, and a sensitive photographic image receiving record strip arranged on the second and a third axis, all comprising a common optical axis with means for moving the record strip transversely to said common optical axis at one speed, and for moving the sensitive photographic image receiving record strip similarly across said common optical axis and at a speed proportional to the speed of the image bearing record strip and the magnification in the axis at the image receiving strip, the afocal anamorphoser comprising means for altering the magnification in one meridian having conjugate object and image planes substantially coincident and the spherical system being positioned exterior to the anamorphoser and adjacent thereto.

2. An optical film printing apparatus as in claim 7 in which the anamorphoser comprises three prisms separated from each other by air spaces of which the front prism is situated at the image expansion end and the back prism at the image reduction end of the anamorphoser, in which the front and back prisms are of substantially the same strength and have their bases lying on one side of the optical axis and the intermediate prism is of substantially twice that strength and has its base lying on the opposite side of the optical axis, the front face of the front prism making an angle with the optical axis which is substantially as small as or smaller than the angle between the front face of the back prism and said axis, the front face of the intermediate prism making an angle with the optical axis substantially as small as or smaller than the aforementioned angles.

3. An optical film printing apparatus as in claim 7 in which the anamorphoser comprises three simple prisms separated from each other by air spaces of which the front prism is situated at the image expansion end and the back prism at the image reduction end of the anamorphoser, the base of the center prism being disposed to one side of the optical axis and the bases of the front and back prisms to the opposite side thereof, in which the Abbe number of the front prism is less than that of either of the other two prisms, and the center prism has an Abbe number intermediate between the Abbe numbers of the front and back prisms.

4. A collinear imaging system for continuous printing of an image strip wherein the magnification is different in two meridians, one parallel to the axis of the strip and one at right angles to this axis, comprising two optical trains having two parallel optical axes, including a source of light and a condensing system on one optical axis, a refracting prism, a record strip bearing an image serving as an object and a relatively wide gate on the second optical axis parallel to the first mentioned axis, a light deflecting element, afocal anamorphoser and spherical imaging system, and a sensitive photographic image receiving record strip arranged on the second and a third axis all comprising a common optical axis, with means for moving the record strip transversely to said common optical axis at one speed, and for moving the sensitive photographic image receiving record strip similar across said common optical axis and at a speed proportional to the speed of the image bearing record strip and the magnification in the axis at the image receiving strip, the afocal anamorphoser comprising means for altering the magnification in one meridian having conjugate object and image planes substantially coincident and positioned at infinity, the spherical system being positioned exterior to the anamorphoser and adjacent thereto and comprising two spherical imaging systems, one to each side of the anamorphoser and having principal foci respectively in the object record strip and the image receiving record strip.

5. An optical film printing apparatus as in claim 7 in which in one meridian the afocal anamorphoser has a magnification effect opposite to that of the spherical system, thereby to make the object record strip and the image receiving record strip more nearly the same size than in the other meridian.

6. An optical film printing apparatus as in claim 7 in which in one meridian the afocal anamorphoser has a magnification effect the same as that of the spherical system, thereby to increase the difference in magnification of the object record strip and the image receiving record strip in the said meridian.

7. An optical film printing apparatus for printing images from a motion picture printing film onto a sensitized film which comprises a source of light, a condenser lens and an objective lens system, all arranged on a common optical axis, means for passing said printing film across said optical axis between said condenser and said objective system, means for passing said sensitized film across said optical axis on the opposite side of said objective lens from said condenser lens, means for deflecting a portion of the light from said source of light along a second optical axis, said second optical axis passing through the paths of said printing film and said sensitized film and anamorphosing means on one of said optical axes for magnifying an image projected along said optical axis to a different degree in a meridian along the length of said sensitized film than in a meridian at right angles to said first meridian and lying in the plane of said sensitized film, said anamorphosing means comprising an afocal anamorphoser having conjugate object and image planes substantially coincident and a spherical system placed immediately adjacent and exterior to the anamorphoser and adapted to imaging the printing film onto the sensitized film, substantially as described.

8. An optical film printing apparatus as in claim 7 in which the anamorphoser comprises three prisms separated from each other by air spaces of which the front prism is situated at the image expansion end and the back prism at the image reduction end of the anamorphoser, in which the front and back prisms are of substantially the same strength and have their bases lying on one side of the optical axis and the intermediate prism is of substantially twice that strength and has its base lying on the opposite side of the optical axis, the front face of the front prism making an angle with the optical axis which is substantially as small as or smaller than the angle between the front face of the back prism and said axis, the front face of the intermediate prism making an angle with the optical axis substantially as small as or smaller than the aforementioned angles, the three prisms being supported in a mount comprising a pair of members, each of said members having a surface thereon adapted to engage an end portion of each of the prisms, only one of said surfaces having prism aligning ledges thereon conforming in spaced and angular relation with a refractive face of each of said prisms.

9. An optical film printing apparatus as in claim 7 in which the anamorphoser comprises three prisms separated from each other by air spaces of which the front prism is situated at the image expansion end and the back prism at the image reduction end of the anamorphoser, in which the front and back prisms are of substantially the same strength and have their bases lying on one side of the optical axis and the intermediate prism is of substantially twice that strength and has its base lying on the opposite side of the optical axis, the front face of the front prism making an angle with the optical axis which is substantially as small as or smaller than the angle between the front face of the back prism and said axis, the front face of the intermediate prism making an angle with the optical axis substantially as small as or smaller than the aforementioned angles, the three prisms being supported in a mount comprising a pair of members, each of said members having a surface thereon adapted to engage an end portion of each of the prisms, only one of said surfaces having prism aligning ledges thereon conforming in spaced and angular relation with a refractive face of each of said prisms, wherein a layer of relatively soft material is provided on one of said surfaces and means is provided for clamping said members together.

10. An optical film printing apparatus for printing images from printing film onto a sensitized film, which comprises a source of light, a condenser lens and an optical system all arranged on a common optical axis, means for passing said printing film across said optical axis between the condenser and said optical system, means for passing said sensitized film across said optical axis on the opposite side of said optical system from said condenser lens, said optical system projecting an image along its optical axis into the plane of said sensitized film with reduction in size of approximately 2½ to 1 in a meridian along the length of said sensitized film and with a different reduction in a meridian at right angles to said first mentioned meridian, said optical system comprising an afocal anamorphoser prism having conjugate object and image planes substantially coincident and a spherical system comprising a lens placed immediately adjacent and exterior to and to each side of the anamorphoser and adapted to image the printing film onto the sensitized film, each lens having a principal focal point in the corresponding film.

11. An optical film printing apparatus for printing images from printing film onto a sensitized film which comprises a source of light, a condenser lens and an optical system all arranged on a common optical axis, means for passing said printing film across said optical axis between the condenser and said optical system, means for passing said sensitized film across said optical axis on the opposite side of said optical system from said condenser lens, said optical system comprising an afocal prism anamorphoser having conjugate object and image planes substantially coincident and positioned at infinity, and a spherical system positioned exterior to the anamorphoser and immediately adjacent thereto and comprising two spherical imaging members, one to each side of the anamorphoser, and having principal foci respectively in the printing film and in the sensitized film, said anamorphoser being adapted to magnify the images to a different degree in a meridian along the length of said sensitized film than in a meridian at right angles to said first meridian.

12. An optical film printing apparatus as in claim 11 in which one of the spherical imaging members is composed of three elements made of at least two different glasses cemented together.

13. An optical film printing apparatus as in claim 11 in which the anamorphoser comprises three prisms separated from each other by air spaces of which the front prism is situated at the image expansion end and the back prism at the image reduction end of the anamorphoser, in which the front and back prisms are of substantially the same strength and have their bases lying on one side of the optical axis and the intermediate prism is of substantially twice that strength and has its base lying on the opposite side of the optical axis, the front face of the front prism making an angle with the optical axis which is substantially as small as or smaller than the angle between the front face of the back prism and said axis, the front face of the intermediate prism making an angle with the optical axis substantially as small as or smaller than the aforementioned angles.

14. An optical film printing apparatus as in claim 11 in which the anamorphoser comprises three simple prisms separated from each other by air spaces of which the front prism is situated at the image expansion end and the back prism at the image reduction end of the anamorphoser, the base of the center prism being disposed to one side of the optical axis and the bases of the front and back prisms to the opposite side thereof, in which the Abbe number of the front prism is less than that of either of the other two prisms, and the center prism has an Abbe number intermediate between the Abbe numbers of the front and back prisms.

15. An optical film printing apparatus as in claim 11 in which the anamorphoser comprises three prisms separated from each other by air spaces of which the front prism is situated at the image expansion end and the back prism at the image reduction end of the anamorphoser, in which the front and back prisms are of substantially the same strength and have their bases lying on one side of the optical axis and the intermediate prism is of substantially twice that strength and has its base lying on the opposite side of the optical axis, the front face of the front prism making an angle with the optical axis which is substantially as small as or smaller than the angle between the front face of the back prism and said axis, the front face of the intermediate prism making an angle with the optical axis substantially as small as or smaller than the aforementioned angles, the three prisms being supported in a mount comprising a pair of members, each of said members having a surface thereon adapted to engage an end portion of each of the prisms, only one of said surfaces having prism aligning ledges thereon conforming in spaced and angular relation with a refractive face of each of said prisms.

16. An optical film printing apparatus as in claim 11 in which the anamorphoser comprises three prisms separated from each other by air spaces of which the front prism is situated at the image expansion end and the back prism at the image reduction end of the anamorphoser, in which the front and back prisms are of substantially the same strength and have their bases lying on one side of the optical axis and the intermediate prism is of substantially twice that strength and has its base lying on the opposite side of the optical axis, the front face of the front prism making an angle with the optical axis which is substantially as small as or smaller than the angle between the front face of the back prism and said axis, the front face of the intermediate prism making an angle with the optical axis substantially as small as or smaller than the aforementioned angles, the three prisms being supported in a mount comprising a pair of members, each of said members having a surface thereon adapted to engage an end portion of each of the prisms, only one of said surfaces having prism aligning ledges thereon conforming in spaced and angular relation with a refractive face of each of said prisms, wherein a layer of relatively soft material is provided on one of said surfaces and means is provided for clamping said members together.

HARRY SIDNEY NEWCOMER.